US009257855B2

(12) United States Patent
Ishikawa (10) Patent No.: US 9,257,855 B2
(45) Date of Patent: Feb. 9, 2016

(54) CHARGER

(71) Applicant: MAKITA CORPORATION, Anjo-shi, Aichi (JP)

(72) Inventor: Yoshihiro Ishikawa, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 197 days.

(21) Appl. No.: 13/969,826

(22) Filed: Aug. 19, 2013

(65) Prior Publication Data

US 2014/0055084 A1  Feb. 27, 2014

(30) Foreign Application Priority Data

Aug. 21, 2012 (JP) ................................. 2012-182349

(51) Int. Cl.
*H02J 7/00* (2006.01)
(52) U.S. Cl.
CPC ............. *H02J 7/0032* (2013.01); *H02J 7/0026* (2013.01); *H02J 7/0029* (2013.01); *H02J 7/0047* (2013.01)
(58) Field of Classification Search
None
See application file for complete search history.

(56) References Cited

U.S. PATENT DOCUMENTS

| 5,526,215 A * | 6/1996 | Higashijima et al. ........... 361/86 |
| 5,963,019 A * | 10/1999 | Cheon ........................... 320/150 |
| 6,331,763 B1 * | 12/2001 | Thomas et al. ................ 320/136 |
| RE41,915 E * | 11/2010 | Haraguchi et al. ........... 320/134 |
| 2010/0060232 A1 * | 3/2010 | Boyles et al. ................. 320/107 |
| 2010/0117602 A1 * | 5/2010 | Matsui et al. ................. 320/152 |
| 2013/0244070 A1 * | 9/2013 | Johnson et al. ................. 429/91 |

FOREIGN PATENT DOCUMENTS

| JP | A-2012-143062 | 7/2012 |
| WO | WO 2012/090664 A1 | 7/2012 |

* cited by examiner

*Primary Examiner* — Leigh Garbowski
(74) *Attorney, Agent, or Firm* — Oliff PLC (57) ABSTRACT

A charger in one aspect of the present invention includes: a connecting portion, two protection devices, a charging device, a control device, and a voltage detection device. A first protection device is configured such that its power consumption in a charging inhibited state is lower than that in a charging permitted state. A second protection device is configured such that its power consumption in the permitted state is lower than that in the inhibited state. The control device is configured to respectively set, when the battery is not connected to the connecting portion, the first protection device to the inhibited state and the second protection device to the permitted state, and thereafter switch, when the voltage value of the charging path detected by the voltage detection device is equal to or greater than a predetermined specified voltage value, the second protection device to the inhibited state.

5 Claims, 4 Drawing Sheets

CHARGER

CROSS-REFERENCE TO RELATED APPLICATIONS

This application claims the benefit of Japanese Patent Application No. 2012-182349 filed Aug. 21, 2012 in the Japan Patent Office, and the entire disclosure of Japanese Patent Application No. 2012-182349 is incorporated herein by reference.

BACKGROUND

The present invention relates to a charger that includes two systems of protection circuits to inhibit charging a battery, at least when the battery is not connected to a connecting portion for charging, to thereby suppress output of a charging voltage from the connecting portion.

A charger of this type is conventionally known as disclosed in, for example, Japanese Unexamined Patent Application Publication No. 2012-143062. In the charger, a pulse-width modulation (PWM) output setting unit to feed back a charging current to a charging device that conducts PWM control of a charging current to a battery and a power source unit to supply a power-supply voltage to the charging device for operation thereof are provided as two systems of protection circuits.

In the charger, when the battery is not connected to a connecting portion, output of the charging voltage from the charging device to the connecting portion is inhibited by setting an output from the PWM output setting unit to a value for setting the charging current to zero and setting an output voltage from the power source unit to 0V.

According to the charger of this type, therefore, even when a malfunction or failure occurs in one of the protection circuits, it is possible to inhibit output of a charging voltage from the charging device to the connecting portion by an operation of the other of the protection circuits, and thus to achieve an enhanced safety of the charger.

SUMMARY

In the aforementioned conventional charger, the two systems of protection circuits have different power consumptions between a charging permitted state and a charging inhibited state.

Then, there has been a problem that, in a case where the protection circuit has a larger power consumption in the charging inhibited state as in the aforementioned PWM output setting unit, an amount of power consumed during a charge-standby time (i.e., so-called standby power consumption), when the two systems of protection circuits are in the charging inhibited state, becomes larger.

Specifically, since the aforementioned power source unit is designed to supply power to the charging device for operation thereof, an output voltage may be set to 0V (or an output current may be set to 0A) in the charging inhibited state, and thus the power source unit may have a smaller power consumption in the charging inhibited state than a power consumption in the charging permitted state.

However, since the aforementioned PWM output setting unit also serves as a feedback circuit for the charging current, it is necessary to increase a detection value of the charging current (in other words, a "detection voltage") to reduce the charging current. Accordingly, in order to use the PWM output setting unit as the protection circuit and bring the PWM output setting unit into the charging inhibited state, it is necessary to maximize the detection voltage of the charging current, and thus the power consumption in the protection circuit becomes larger.

In such a case where the power consumption in the protection circuit is larger in the charging inhibited state than in the charging permitted state, if the protection circuit is brought into the charging inhibited state during a charge-standby time when the battery is not connected, the charger will have a larger power consumption due to the larger power consumption in the protection circuit.

In one aspect of the present invention, it is preferable to provide a charger that includes two systems of protection circuits to inhibit charging a battery during a standby time when the battery is not connected, and sufficiently reduces standby power consumption even in a case where one of the protection circuits has a larger power consumption in its charging inhibited state.

A charger in one aspect of the present invention includes a connecting portion, two protection devices, a charging device, a control device, and a voltage detection device. A battery is connected to the connecting portion. The two protection devices are configured to switch between inhibition and permission of charging of the battery. The charging device is configured to stop charging of the battery in a case where at least one of the two protection devices is in a charging inhibited state, in which charging the battery is inhibited, and to perform charging the battery in a case where both of the two protection devices are in a charging permitted state, in which charging the battery is permitted. The control device is configured to, when the battery is connected to the connecting portion, bring the two protection devices into the charging permitted state to thereby permit charging the battery by the charging device. The voltage detection device is configured to detect a voltage value of a charging path from the charging device to the connecting portion. A first protection device, which is one of the two protection devices, is configured such that its power consumption in the charging inhibited state is lower than its power consumption in the charging permitted state. A second protection device, which is the other of the two protection devices, is configured such that its power consumption in the charging permitted state is lower than its power consumption in the charging inhibited state. The control device is configured to respectively set, when the battery is not connected to the connecting portion, the first protection device to the charging inhibited state and the second protection device to the charging permitted state, and thereafter switch, when the voltage value of the charging path detected by the voltage detection device is equal to or greater than a predetermined specified voltage value, the second protection device to the charging inhibited state.

According to the charger configured as above, when the battery is not connected to the connecting portion, charging the battery by the charging device may be inhibited, and also power consumption in the first protection device and the second protection device may be reduced.

Also, in the charger, the control device is configured such that, after respectively setting the two protection devices as described above when the battery is not connected to the connecting portion, the control device monitors the voltage value in the charging path detected by the voltage detection device, and switches the second protection device to the charging inhibited state if the detected voltage value is equal to or greater than the specified voltage value.

Thus, according to the charger, if an abnormality occurs in the first protection device and thereby the first protection device cannot be set to the charging inhibited state when the battery is not connected to the connecting portion, the second protection device is switched to the charging inhibited state to thereby suppress output of a charging voltage from the charging device to the connecting portion.

The charger may include a display unit configured to display a state of the charger. In this case, the control device may be configured to display, in a case where the control device switches the second protection device to the charging inhibited state when the battery is not connected to the connecting portion, an abnormality on the display unit when the battery is thereafter connected to the connecting portion.

According to the charger with such configuration, if an abnormality occurs in operation of the first protection device, and the second protection device is switched to the charging inhibited state, it is possible to provide a notification of the facts to a user of the charger.

Since such notification to the user by the display unit is provided when the user connects the battery to the connecting portion for charging of the battery, the notification to the user may be efficiently made when the user looks at the charger.

The aforementioned charger may include a current detection device configured to detect a current value flowing through the charging path. In this case, the control device may be configured to respectively set, when the battery is connected to the connecting portion and charging the battery by the charging device has been completed, the first protection device to the charging inhibited state and the second protection device to the charging permitted state, and thereafter switch, when the current value detected by the current detection device exceeds a predetermined specified current value, the second protection device to the charging inhibited state.

According to the charger with such configuration, after completion of charging of the battery by the charging device, it is possible to inhibit charging the battery by the charging device by means of the first protection device, and also reduce power consumption in the first protection device and the second protection device.

Also, when charging the battery by the charging device has been completed, the control device sets the first protection device and the second protection device to the respective states as described above, and monitors the current value detected by the current detection device. When the detected current value exceeds the specified current value, the control device switches the second protection device to the charging inhibited state.

According to the charger with such configuration, if the first protection device cannot be set to the charging inhibited state after completion of charging the battery by the charging device, it is possible to switch the second protection device to the charging inhibited state to thereby suppress output of a charging current from the charging device to the battery.

It may be such that an abnormality in the first protection device is displayed on a display unit provided in the charger when the second protection device is switched to the charging inhibited state after completion of charging of the battery by the charging device as described above.

The aforementioned two protection devices may have any configuration. For example, each of the two protection devices may have a photo coupler configured to be brought into a conductive state by a light entering from a light emitting device into a light receiving device. In this case, the first protection device may be configured such that the light emitting device of the photo coupler emits a light when the first protection device is in the charging permitted state. The second protection device may be configured such that the light emitting device of the photo coupler emits a light when the second protection device is in the charging inhibited state.

There is a known charger configured such that a charging device generates a charging voltage by converting an externally inputted AC (Alternating Current) voltage to a DC (Direct Current) voltage. The charger of this type sometimes includes a transformer to reduce the AC voltage, and the transformer electrically separates a side of the charging path to the battery from a side of an AC power source.

In the charger of this type, an amount of power to be supplied to a secondary side (in other words, a battery side) of the transformer is controlled on a primary side (in other words, an AC power source side) of the transformer. Therefore, a photo coupler is usually used for a circuit to feed back conditions (a charging voltage or a charging current) on the secondary side to a circuit on the primary side.

In a case of using such a feedback circuit provided with a photo coupler as a protection device, the first protection device and the second protection device may be configured as described above.

Alternatively, the two protection devices may include two switches provided in series in the charging path and configured to open and close the charging path, one switch of the two switches corresponding to the first protection device and the other switch of the two switches corresponding to the second protection device.

In this case, the one switch may include a normally open switch configured to be brought into a closed state (in other words, a charging permitted state) by electric conduction. The other switch may include a normally closed switch configured to be brought into an open state (in other words, a charging inhibited state) by electric conduction.

BRIEF DESCRIPTION OF THE DRAWINGS

The present invention will now be described below by way of example with reference to the accompanying drawings, in which.

DETAILED DESCRIPTION OF THE PREFERRED EMBODIMENTS

Figure 1:
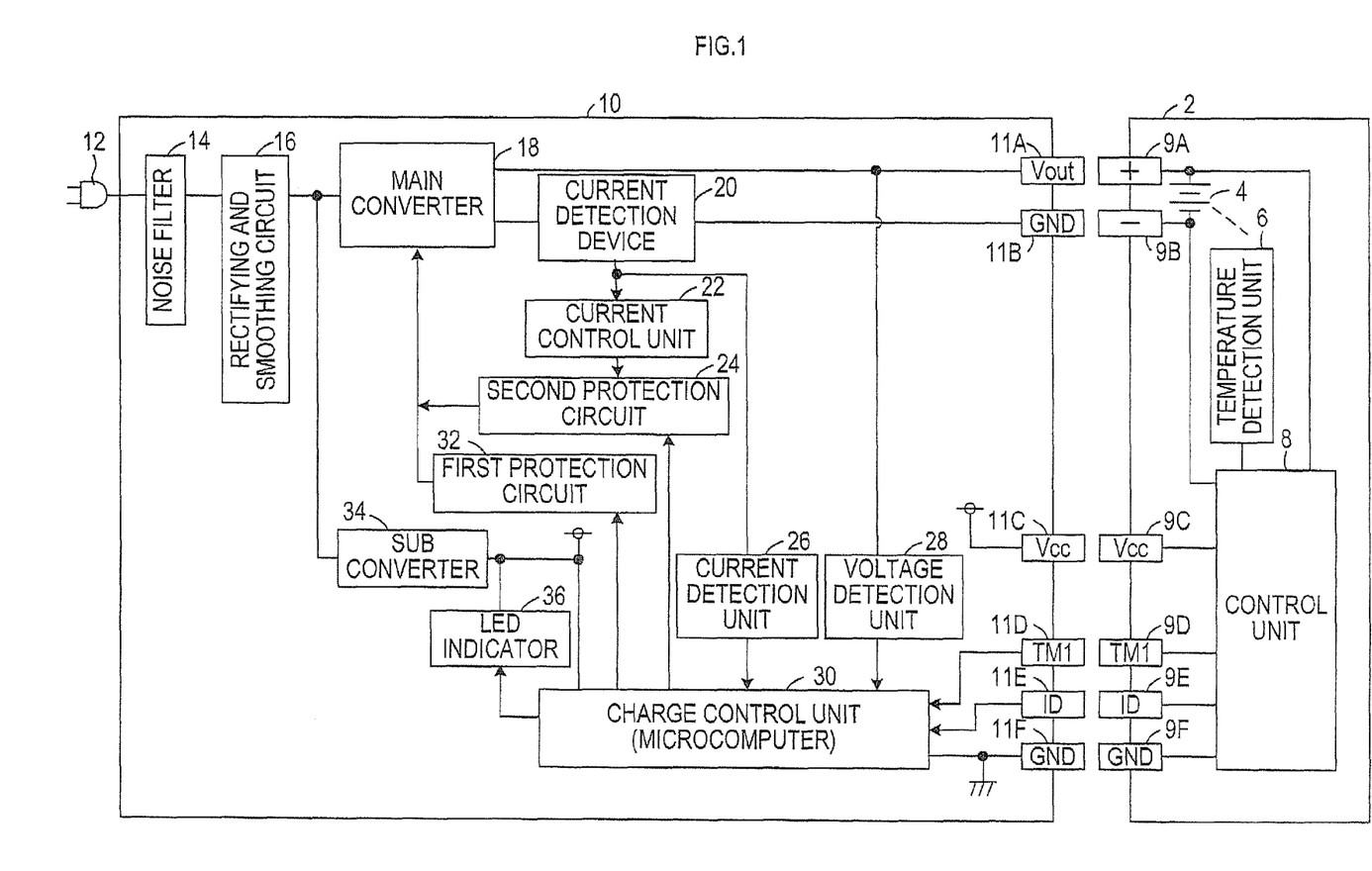
FIG. 1 is a block diagram showing a configuration of a charger and a battery pack in one embodiment of the present invention.

As shown in FIG. 1, a charger 10 in one embodiment of the present invention is configured to operate upon receiving an AC voltage from an external power source (usually a commercial power source) through a power plug 12, and charge a battery 4 contained in a battery pack 2 for an electric power tool.

The charger 10 is provided with an attachment portion (not shown) to which the battery pack 2 is detachably attachable, and the attachment portion is provided with six terminals 11A to 11F as connecting portions to the battery pack 2.

Among these terminals, terminals 11A and 11B are configured to be connected to a positive electrode side and a negative electrode side, respectively, of the battery 4 through terminals 9A and 9B, respectively, of the battery pack 2 when the battery pack 2 is attached, to thereby output a charging voltage.

Also, terminals 11C and 11F are configured to be connected to terminals 9C and 9F, respectively, of the battery pack 2, to thereby supply a constant power-supply voltage Vcc to the battery pack 2. The terminals 11F and 9F are connected to the ground of the charger 10 and the ground of the battery pack 2, respectively. That is, by interconnecting the terminals 11F and 9F, the ground of the charger 10 and the ground of the battery pack 2 have a same electric potential.

The terminals 11D and 11E are configured to obtain a temperature of the battery 4 and identification information (ID) of the battery pack 2 from the battery pack 2 through terminals 9D and 9E of the battery pack 2.

The battery pack 2 includes a temperature detection unit 6 to detect a temperature of the battery 4, and a control unit 8 to output the temperature of the battery 4 detected by the temperature detection unit 6 and the identification information (ID) of the battery pack 2 through the terminals 9D and 9E. The control unit 8 operates upon receiving the power-supply voltage Vcc supplied from the charger 10 through the terminals 11C and 11F, and the terminals 9C and 9F.

Next, the charger 10 is configured to receive the AC voltage from the power plug 12 through a noise filter 14, and rectify and smooth the AC voltage by the rectifying and smoothing circuit 16, including a diode bridge or the like.

An output (a DC voltage) from the rectifying and smoothing circuit 16 is outputted to a main converter 18 and a sub converter 34.

The main converter 18 is configured to convert the DC voltage from the rectifying and smoothing circuit 16 to a charging voltage to the battery 4 and output the charging voltage. Positive and negative output terminals of the main converter 18 are connected to the battery 4 through the terminals 11A and 11B, and the terminals 9A and 9B when the battery pack 2 is attached.

In a charging path from the main converter 18 to the terminal 11B, a current detection device 20 to detect a charging current value is provided.

A detection signal from the current detection device 20 is inputted to a current control unit 22 to perform feedback control of the charging current value, and a control signal from the current control unit 22 is inputted to the main converter 18 through a second protection circuit 24.

When set to a charging permitted state by the charge control unit 30, the second protection circuit 24 outputs the control signal from the current control unit 22 to the main converter 18, to thereby cause the charging current value to be feedback-controlled to a predetermined target current value.

When set to a charging inhibited state by the charge control unit 30, the second protection circuit 24 sets an output to the main converter 18 to a set value so as to control the charging current value to be zero, to thereby stop charging the battery 4.

When set to a charging inhibited state by the charge control unit 30, the second protection circuit 24 outputs to the main converter 18 a control signal indicating that the charging current value is a maximum value, to thereby make a duty ratio of PWM control approximately zero, in order to stop charging. Therefore, a power consumption in the charging inhibited state is larger than a power consumption in the charging permitted state. In the charging permitted state, the second protection circuit 24 outputs the control signal straight from the current control unit 22, and thus a power consumption of the second protection circuit 24 itself is approximately zero In addition to the second protection circuit 24, the charger 10 includes a first protection circuit 32 to inhibit or permit charging operation to the battery 4 by the main converter 18.

The first protection circuit 32 outputs a signal permitting charging operation to the main converter 18 when set to the charging permitted state by the charge control unit 30, and outputs a signal inhibiting charging operation to the main converter 18 when set to the charging inhibited state by the charge control unit 30.

When both of inputted signals from the first protection circuit 32 and the second protection circuit 24 are signals indicating permission of charging, the main converter 18 outputs a charging voltage to the battery 4, while when at least one of the inputted signals from the first protection circuit 32 and the second protection circuit 24 is a signal indicating inhibition of charging, the main converter 18 stops output of a charging voltage to the battery 4.

The first protection circuit 32 is configured such that its power consumption when set to the charging inhibited state by the charge control unit 30 is smaller than its power consumption when set to the charging permitted state, and is approximately zero.

The sub converter 34 is configured to receive the DC voltage from the rectifying and smoothing circuit 16 and to generate a constant DC voltage (the power-supply voltage Vcc) to drive individual circuits, including the charge control unit 30, in the charger 10.

The power-supply voltage Vcc generated by the sub converter 34 is supplied to the charge control unit 30 as well as to the aforementioned protection circuits 32 and 24, and the terminal 11C through power supply lines in the charger 10.

The charger 10 also includes a current detection unit 26 and a voltage detection unit 28. The current detection unit 26 detects a charging current value based on a detection signal from the current detection device 20. The voltage detection unit 28 detects a voltage value of a charging path from the main converter 18 to the terminal 11A (i.e., a charging voltage to the battery 4).

The charging current value and the charging voltage value (more specifically, electric signals representing these values) detected by the current detection unit 26 and the voltage detection unit 28, respectively, are inputted to the charge control unit 30.

The charge control unit 30 is constituted by a microcomputer, including a CPU, a ROM, a RAM, etc., as main components. When the battery pack 2 is connected to the charger 10, the charge control unit 30 sets the first protection circuit 32 and the second protection circuit 24 to the charging permitted state, to thereby permit charging the battery 4 by the main converter 18.

When charging the battery 4 has been completed, or the battery pack 2 is not connected to the charger 10, the charge control unit 30 sets at least one of the first protection circuit 32 and the second protection circuit 24 to the charging inhibited state.

Accordingly, when charging the battery 4 has been completed, or the battery pack 2 is not connected to the charger 10, the main converter 18 stops charging the battery 4.

Inhibition of charging the battery 4 by the main converter 18 is intended to suppress overcharge to the battery 4 as well as to suppress a decrease in safety due to application of a charging voltage to the terminal 11A and 11B when the battery pack 2 is not connected. Specifically, it is possible to suppress an unintended electrically conductive object from contacting the terminal 11A and 11B and thereby causing electric conduction.

Also, in the present embodiment, a logical value of a command signal when the charge control unit 30 sets the first protection circuit 32 to the charging inhibited state is set to be opposite to a logical value of a command signal to set the second protection circuit 24 to the charging inhibited state.

More specifically, it is configured such that, for example, the first protection circuit 32 is brought into the charging inhibited state by receiving a command signal having a high-level logical value, while the second protection circuit 24 is brought into the charging inhibited state by receiving a command signal having a low-level logical value. Alternatively, the first protection circuit 32 may be configured to be brought into the charging inhibited state by receiving a command signal having a low-level logical value, and in this case, the second protection circuit 24 may be configured to be brought into the charging inhibited state by receiving a command signal having a high-level logical value.

This is to suppress output of a charging voltage from the main converter 18 as a result of one of the protection circuits 32 and 24 being brought into the charging inhibited state in a case where the microcomputer constituting the charge control unit 30 breaks down and the logical value of output to each of the protection circuits 32 and 24 is fixed to one of a high-level or a low-level.

Further, the charger 10 is provided with an LED indicator 36 to indicate an operation condition and an abnormal operation of the charger 10 by lighting or blinking an LED. When detecting an abnormal operation of the charger 10, the charge control unit 30 notifies such abnormality through the LED indicator 36.

Hereinafter, a control operation by the charge control unit 30 will be described according to a flowchart shown in FIG. 2.

Figure 2:
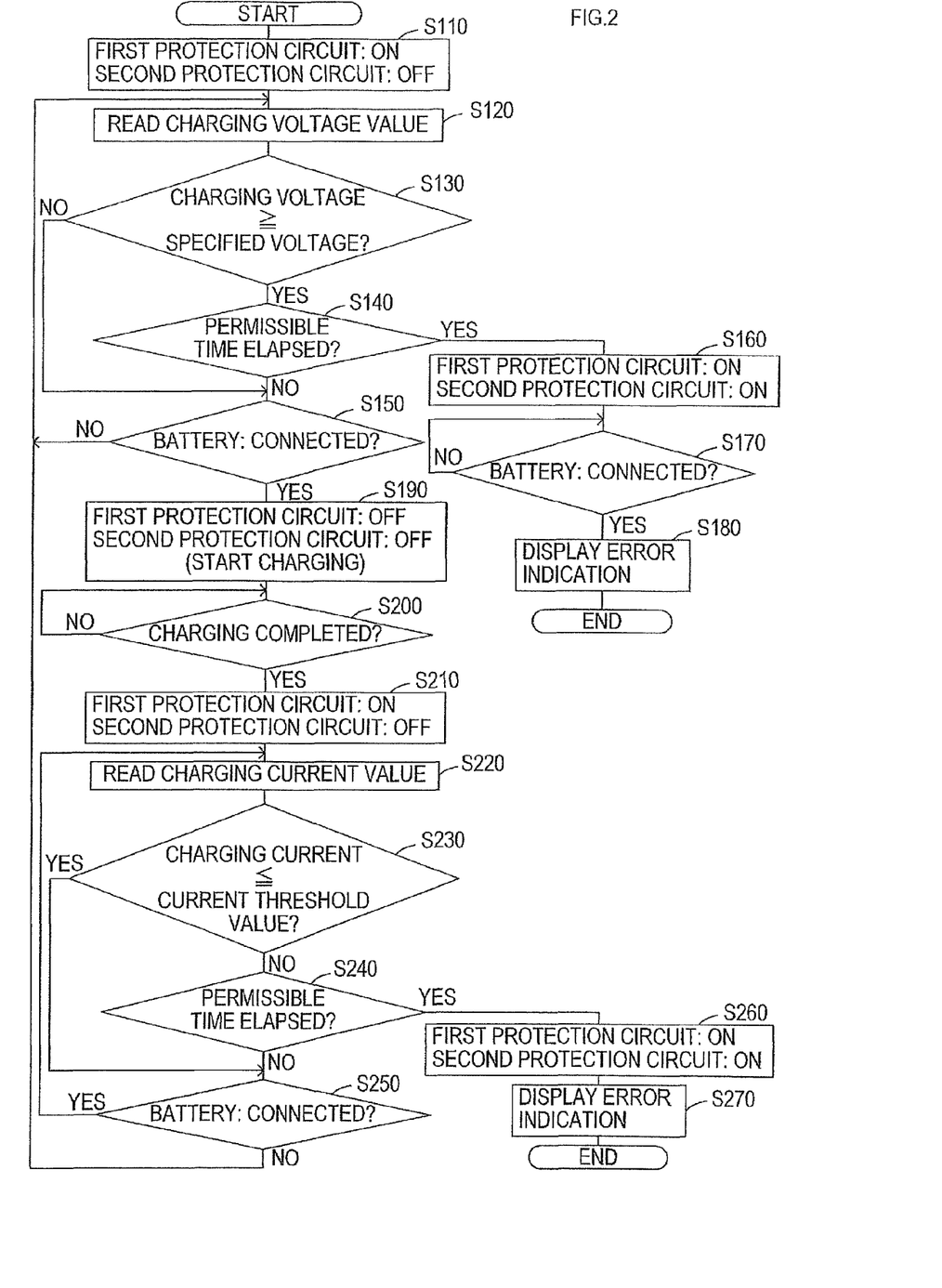
FIG. 2 is a flowchart showing a control process executed by a charge control unit in the charger.

The flowchart shown in FIG. 2 represents a charge control process that is started when a power-supply voltage Vcc is generated by the sub converter 34 and the power-supply voltage Vcc is supplied to the charge control unit 30, and then is repeatedly executed by the CPU in the charge control unit 30 until supply of the power-supply voltage Vcc is stopped.

As shown in FIG. 2, when the charge control process is started, the first protection circuit 32 is first set to the charging inhibited state (hereinafter, also referred to as an "ON state") in S110 (S represents "step"), to thereby stop charging operation to the battery 4 by the main converter 18.

In S110, the second protection circuit 24 is set to the charging permitted state (hereinafter, also referred to as an "OFF state") in order to reduce power consumption in the second protection circuit 24.

Next, in S120, a charging voltage value detected by the voltage detection unit 28 is read. In subsequent S130, it is determined whether or not the charging voltage value is equal to or greater than a predetermined specified voltage value.

The specified voltage value is set to a voltage value that is lower than a maximum voltage value to be outputted from the main converter 18 during charging of the battery 4 and higher than a voltage value (approximately 0V) while the main converter 18 stops charging operation.

Specifically, the specified voltage value is set to approximately 20V. The reason for setting a threshold value not to approximately 0V but to a voltage value relatively close to the maximum voltage value is that, if the battery pack 2 is detached from the charger 10 during charging operation, the charging voltage value instantaneously reaches the maximum voltage value of the main converter 18 and thereafter a current resulting from the charging voltage is discharged through a resistor of a relatively high impedance, such as a voltage detection resistor, requiring a long time for the charging voltage value to be reduced to approximately 0V.

When the charging voltage value is equal to or greater than the specified voltage value, the present process proceeds to S140, in which it is determined whether or not an elapsed time in which the charging voltage value is equal to or greater than the specified voltage value is equal to or longer than a predetermined permissible time. When the elapsed time has not reached the permissible time, the present process proceeds to S150, while when the elapsed time is equal to or longer than the permissible time, the present process proceeds to S160.

If it is determined in S130 that the charging voltage value is lower than the specified voltage value, the present process proceeds to S150.

Next, in S160, since a voltage equal to or greater than the specified voltage value is outputted from the main converter 18 although the first protection circuit 32 is in the ON state, it is determined that an abnormal state where the first protection circuit 32 does not function normally has occurred, and the second protection circuit 24 is switched to the ON state.

As the result that the second protection circuit 24 has been switched to the ON state, the main converter 18 stops charging operation. Thus, it is possible to suppress output of the charging voltage from the terminals 11A and 11B due to an abnormal operation of the first protection circuit 32, which results in a decrease in safety of the charger 10.

After switching the second protection circuit 24 to the ON state in S160 to thereby bring the first protection circuit 32 and the second protection circuit 24 into the ON state, the present process proceeds to S170. In S170 it is determined whether or not the battery 4 is connected to the charger 10 and connection of the battery 4 is waited for.

When the battery 4 is connected to the charger 10, the present process proceeds to S180. In S180, an error indication (for example, by blinking of an LED) is displayed on the LED indicator 36 to notify a user of an abnormal state of the first protection circuit 32.

The error indication in S180 continues until the user shuts off power supply to the charger 10 and the charge control unit 30 stops operation. When the charge control unit 30 stops operation, the present charge control process is terminated. Alternatively, if the battery pack 2 is detached from the charger 10 and thereby the battery 4 is not connected to the charger 10, while the error indication is displayed, the present charge control process may be returned to the start of the flowchart.

The determination in S170 as to whether or not the battery 4 is connected is made based on, for example, a current flowing from the terminal 11C to the battery pack 2, signal inputs from the battery pack 2 to the terminals 11D and 11E, etc.

In S150, it is determined whether or not the battery 4 is connected to the charger 10 in a same manner as in S170. When the battery 4 is not connected to the charger 10, the present process proceeds to S120, while when the battery 4 is connected to the charger 10, the present process proceeds to S190.

In S190, by switching the first protection circuit 32 and the second protection circuit 24 to the OFF state, charging operation from the main converter 18 to the battery 4 is permitted, and the main converter 18 is caused to start charging the battery 4.

In subsequent S200, it is determined whether or not charging the battery 4 has been completed based on the charging current value detected by the current detection unit 26, the charging voltage value detected by the voltage detection unit 28, etc., and completion of charging the battery 4 is waited for.

When it is determined in S200 that charging the battery 4 has been completed, the present process proceeds to S210. In S210, as in aforementioned S110, the first protection circuit 32 is set to the ON state and the second protection circuit 24 is set to the OFF state, to thereby inhibit charging operation to the battery 4 by the main converter 18.

Subsequently, the charging current value detected by the current detection unit 26 is read in S220, and it is determined in S230 whether or not the charging current value is equal to or less than a predetermined current threshold value.

The current threshold value is set to a higher current value than a current value (approximately zero) while charging operation is stopped by the main converter 18.

When the charging current value is equal to or less than the current threshold value, the present process proceeds to S250. When the charging current value exceeds the current threshold value, the present process proceeds to S240, in which it is determined whether or not an elapsed time in which the charging current value exceeds the current threshold value is equal to or longer than a predetermined permissible time.

When it is determined in S240 that the elapsed time in which the charging current value exceeds the current threshold value has not reached the permissible time, the present process proceeds to S250, while when it is determined that the elapsed time in which the charging current value exceeds the current threshold value is equal to or longer than the permissible time, the present process proceeds to S260.

In S260, since the charging current having a value exceeding the current threshold value flows from the main converter 18 to the battery 4 although the first protection circuit 32 is set to the ON state, the charge control unit 30 determines that an abnormal state where the first protection circuit 32 does not function normally has occurred, and the second protection circuit 24 is switched to the ON state in the same manner as in S160.

As a result, the main converter 18 stops charging operation since the second protection circuit 24 has been switched to the ON state. Thus, it is possible to suppress output of the charging current from the main converter 18 to the battery 4.

After switching the second protection circuit 24 to the ON state in S260, the present process proceeds to S270. In S270, in the same manner as in S180, an error indication (for example, by blinking of an LED) is displayed on the LED indicator 36 to notify the user of an abnormal state of the first protection circuit 32 and subsequently the charge control process is terminated.

In S250, it is determined whether or not the battery 4 is connected to the charger 10 according to the same process as in S150 and S170.

When the battery 4 is connected to the charger 10, the present process proceeds to S220, while when the battery pack 2 is removed from the charger 10 and thereby the battery 4 is not connected, the present process proceeds to S120.

As described above, in the charger 10 of the present embodiment, the first protection circuit 32 is configured such that its power consumption when set to the ON state (i.e., the charging inhibited state) is smaller than its power consumption when set to the OFF state (i.e., the charging permitted state).

Detection of abnormality by detecting the current in S200 to S250 may be performed regardless of whether or not to execute the processes in S110 to S190.

Since the second protection circuit 24 also serves as a circuit for feeding back the charging current value, the second protection circuit 24 is configured such that its power consumption when set to the ON state (i.e., the charging inhibited state) is larger than its power consumption when set to the OFF state (i.e., the charging permitted state).

As shown in Table 1, during a charging standby state or a charging completed state, the first protection circuit 32 is set to the ON state and the second protection circuit 24 is set to the OFF state, to thereby stop the charging operation of the main converter 18. The charging standby state here means a state where the battery pack 2 is not attached to the charger 10. The charging completed state here means a state where charging the battery 4 is completed although the battery pack 2 is attached to the charger 10.

According to the charger 10 of the present embodiment, therefore, it is possible to sufficiently reduce amounts of power consumed in the protection circuits 32 and 24 during the charging standby state or the charging completed state.

TABLE 1

| Condition of Apparatus | During Charging Standby State or During Charging Completed State | | — | During Charging |
|---|---|---|---|---|
| | Abnormal Output | Normal Output | | |
| First Protection Circuit | ON (Inhibited) | ON (Inhibited) | OFF (Permitted) | OFF (Permitted) |
| Second Protection Circuit | ON (Inhibited) | OFF (Permitted) | ON (Inhibited) | OFF (Permitted) |
| Output Transition | Charging Inhibited | Charging Inhibited | Charging Inhibited | Charging Permitted |
| Power Consumption | Second Protection Circuit | None | Both Protection Circuits | First Protection Circuit |

Also, as shown in Table 1, in a case where the charging voltage value is equal to or greater than the specified voltage value during the charging standby state, or in a case where the charging current value exceeds the current threshold value during the charging completed state, that is, if the charger is in an abnormal state and an abnormal output occurs, the second protection circuit 24 is switched to the ON state in addition to the first protection circuit 32. Thus, it is possible to stop the charging operation of the main converter 18 by an operation of the second protection circuit 24.

In such condition, the amount of power consumed in the first protection circuit 32 can be reduced, although the amount of power consumed in the second protection circuit 24 is increased, and thereby the power consumption in the charger 10 can be suppressed.

Also, as shown in Table 1, during charging of the battery 4, both the first protection circuit 32 and the second protection circuit 24 are set to the OFF state. In such condition, the amount of power consumed in the second protection circuit 24 can be reduced, although the amount of power consumed in the first protection circuit 32 is increased, and thereby the power consumption in the charger 10 can be suppressed.

It is, therefore, possible to accelerate energy saving of the charger 10 according to the charger 10 of the present embodiment.

In the present embodiment, each of the terminals 11A and 11B corresponds to an example of a connecting portion of the present invention, the first protection circuit 32 and the second protection circuit 24 correspond to an example of two protection devices (more specifically, a first protection device and a second protection device) of the present invention, and the main converter 18 corresponds to an example of a charging device of the present invention.

Also, the voltage detection unit 28 corresponds to an example of a voltage detection device of the present invention, the current detection unit 26 corresponds to an example of a current detection device of the present invention, and the charge control unit 30 corresponds to an example of a control device of the present invention.

Although one embodiment of the present invention has been described above, the present invention should not be limited to the above described embodiment, but may be practiced in various forms without departing from the scope of the subject matter of the present invention.

[Modified Example]

For example, in a case where the main converter 18 is configured so as to electrically separate, by a transformer or the like, a side of the charging path (a secondary side) to the battery 4 and a side of an external AC power source (a primary side) in the above described embodiment, it is preferable that each of the first protection circuit 32 and the second protection circuit 24 is separated into the primary side and the secondary side and a signal indicating permission/inhibition of charging is transmitted in a non-contact manner from the secondary side to the primary side.

In this case, it is preferable to provide a photo coupler constituted by a light emitting device and a light receiving device in each of the protection circuits 32 and 24.

That is, the light receiving device of the photo coupler is disposed on the primary side and the light emitting device is disposed on the secondary side in each of the protection circuits 32 and 24 such that a light from the light emitting device enters into the light receiving device, and thereby the photo coupler is brought into a conducting state and transmits a signal indicating permission/inhibition of charging from the secondary side to the primary side in a non-contact manner.

With such configuration, it is possible to electrically separate (isolate) the side of the charging path to the battery 4 (the secondary side) and the side of the external AC power source (the primary side) within the charger 10.

Figure 3:
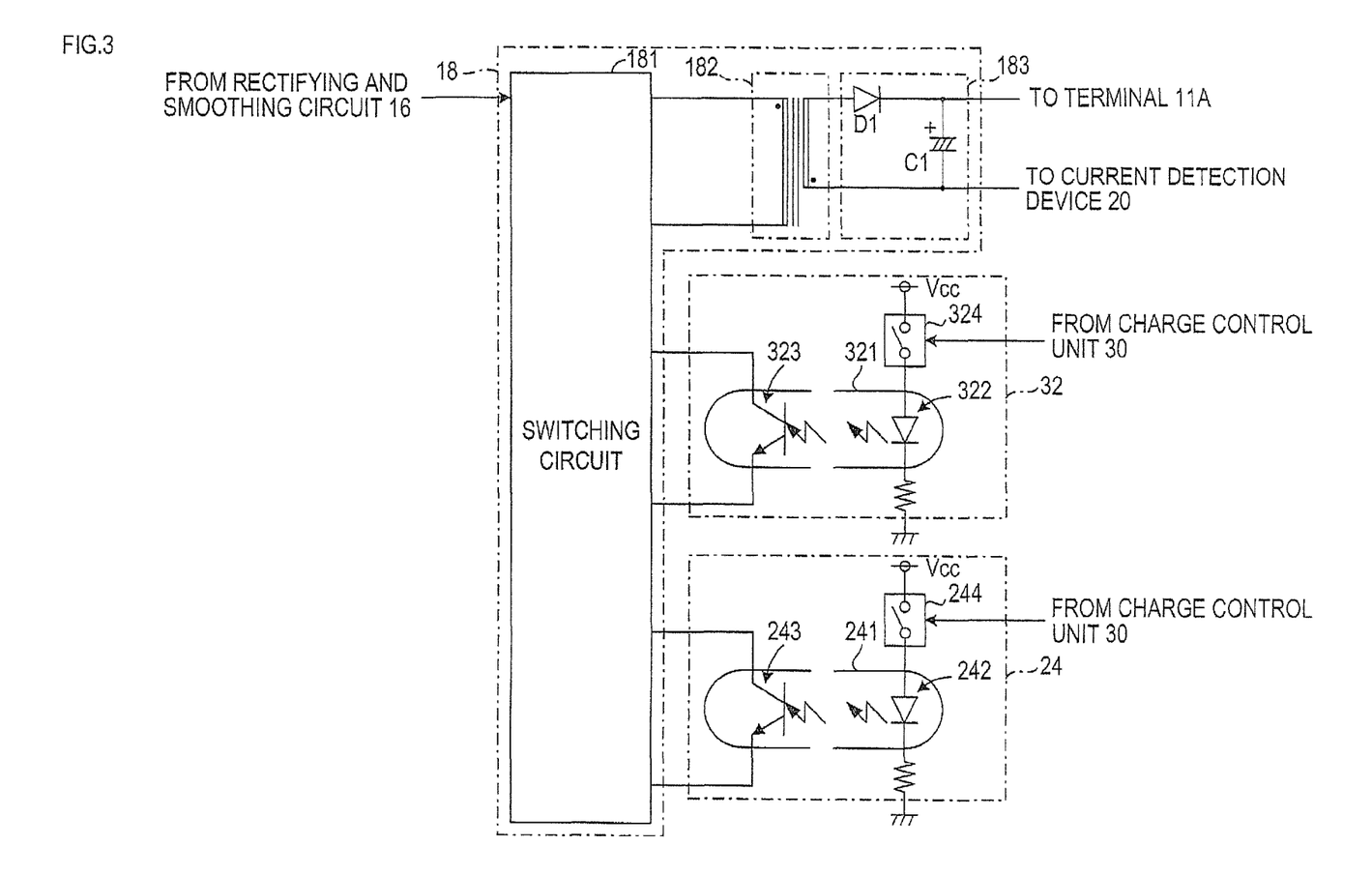
FIG. 3 is a circuit diagram showing a schematic configuration of a main converter and two protection circuits in a modified example of the embodiment.

More specifically, as shown in FIG. 3, the main converter 18 may include a switching circuit 181, a transformer 182, and a rectifying circuit 183. The switching circuit 181 includes at least one switching device (not shown) and is configured to intermittently output DC power, which is outputted from the rectifying and smoothing circuit 16, to the transformer 182 by switching the switching device. A positive side of a secondary side of the transformer 182 is connected to the terminal 11A through a diode D1 of the rectifying circuit 183, while a negative side of the secondary side of the transformer 182 is connected to the current detection device 20. The transformer 182 reduces, on the secondary side of the transformer 182, a voltage of the DC power intermittently supplied from the switching circuit 181 to a primary side of the transformer 182, and output the DC power to the rectifying circuit 183. The rectifying circuit 183 includes the aforementioned diode D1 and a capacitor C1, and is configured to smooth the DC power intermittently outputted from the secondary side of the transformer 182 by means of the diode D1 and the capacitor C1 and output the smoothed DC power to the battery 4.

The first protection circuit 32 includes a photo coupler 321. A light emitting device 322 of the photo coupler 321 is configured such that when the first protection circuit 32 is set to the charging permitted state by the charge control unit 30, a switch 324 is turned on and the light emitting device 322 is lit by application of the power-supply voltage Vcc. That is, the first protection circuit 32 has a larger power consumption by causing the light emitting device 322 to emit light in the charging permitted state than in the charging inhibited state. A light receiving device 323 of the photo coupler 321 is connected to a switching circuit 181.

The second protection circuit 24 includes a photo coupler 241. A light emitting device 242 of the photo coupler 241 is configured such that when the second protection circuit 24 is set to the charging inhibited state by the charge control unit 30, a switch 244 is turned on and the light emitting device 242 is lit by application of the power-supply voltage Vcc. That is, the second protection circuit 24 has a larger power consumption by causing the light emitting device 242 to emit light in the charging inhibited state than in the charging permitted state. A light receiving device 243 of the photo coupler 241 is connected to the switching circuit 181.

The switching circuit 181 is configured to stop switching of the switching device while at least the light emitting device 322 of the first protection circuit 32 is off, or while at least the light emitting device 242 of the second protection circuit 24 emits light.

That is, with such configuration, it is possible to enhance energy saving of the charger 10 by switching over between the charging permitted state and the charging inhibited state of the first protection circuit 32 and the second protection circuit 24 according to a control procedure similar to that in the above described embodiment shown in FIG. 2.

In this case, although the light emitting device 242 of the second protection circuit 24 blinks in accordance with a control signal from the current control unit 22 through a path not shown in FIG. 3 in the charging permitted state, the current flowing to the light emitting device 242 is smaller than in a case of lighting the light emitting device 242 in the charging inhibited state.

Accordingly, the power consumption of the second protection circuit 24 in the charging permitted state is smaller than the power consumption in the charging inhibited state, which allows achievement of the same effects as in the above described embodiment.

In a case of providing two systems of protection circuits as in the above described embodiment to thereby more safely suppress output of a charging voltage or a charging current from the charger 10, the two protection circuits need not necessarily be configured to stop the operation of the main converter 18.

Figure 4:
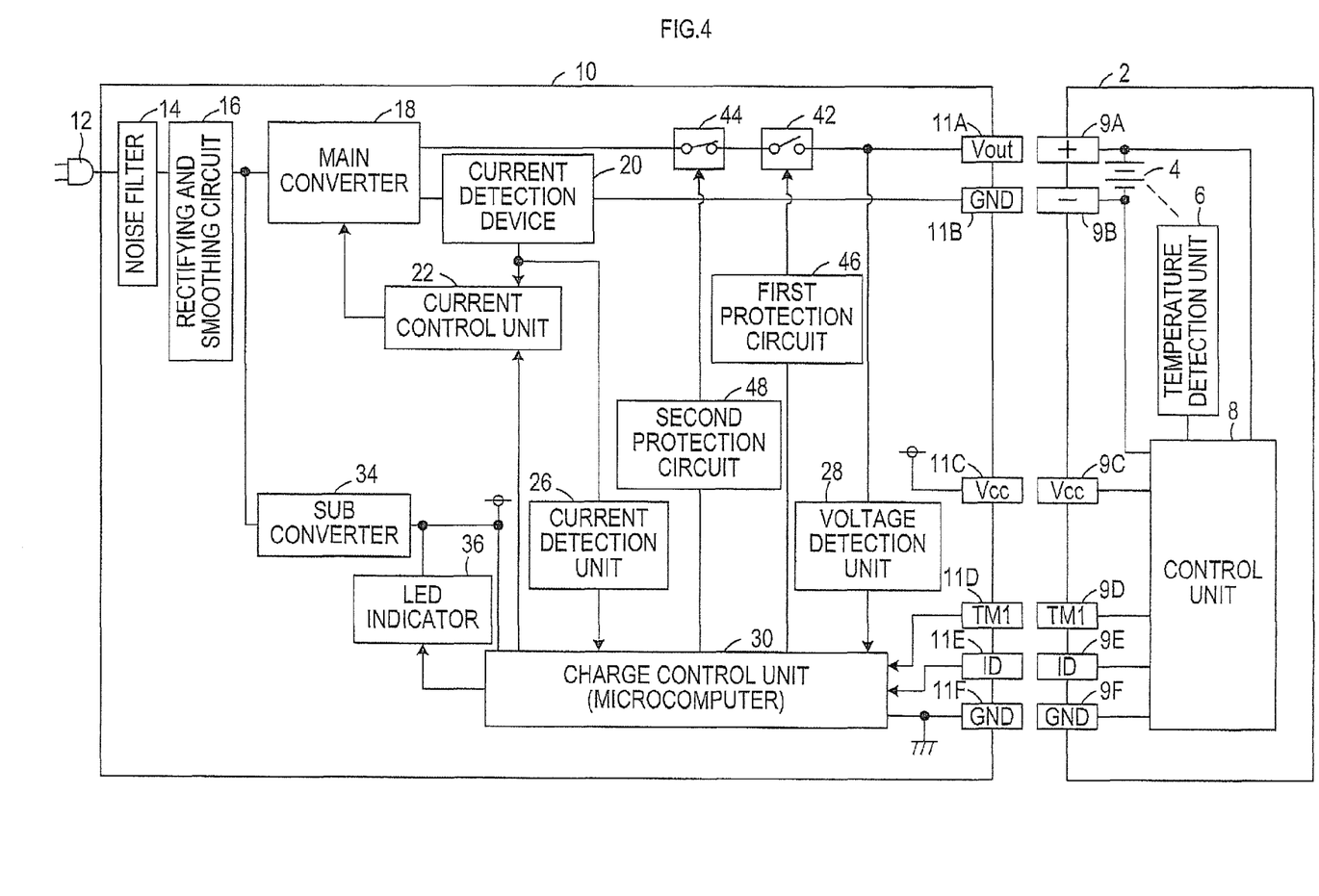
FIG. 4 is a block diagram showing a modified example of the charger.

That is, as shown in FIG. 4, it may be possible to provide two switches 42 and 44, each of which includes a relay or a semiconductor device, in series in the charging path from the main converter 18 to the terminal 11A, and switch between open and closed states of these switches 42 and 44 by a first protection circuit 46 and a second protection circuit 48, respectively.

In this case, a normally open switch that is brought into the closed state (in other words, the charging permitted state) by electric conduction from the first protection circuit 46 may be used for the switch 42 corresponding to the first protection circuit 46, while a normally closed switch that is brought into the open state (in other words, the charging inhibited state) by electric conduction from the second protection circuit 48 may be used for the switch 44 corresponding to the second protection circuit 48.

With such configuration, the same effects as in the above described embodiment may be achieved by switching between the charging permitted state and the charging inhibited state of each of the first protection circuit 46 and the second protection circuit 48 according to the same control procedure as in the above described embodiment shown in FIG. 2.

While it is described in the above described embodiment that the charger 10 is configured to charge the battery pack 2 for an electric power tool, the charger of the present invention may be configured to charge a battery other than the battery 4 installed in the battery pack 2 for an electric power tool.

It is described in the above described embodiment that the photo coupler or the relay constituting the first protection circuit 32 or 46 has lower power consumption in the charging inhibited state, while the photo coupler or the relay constituting the second protection circuit 24 or 48 has lower power consumption in the charging permitted state. On the contrary, it may be configured such that the photo coupler or the relay constituting the first protection circuit 32 or 46 has lower power consumption in the charging permitted state, while the photo coupler or the relay constituting the second protection circuit 24 or 48 has lower power consumption in the charging inhibited state.

What is claimed is:

1. A charger comprising:
   a connecting portion configured to connect a battery;
   two protection devices configured to switch between inhibition and permission of charging the battery;
   a charging device configured to stop charging the battery in a case where at least one of the two protection devices is in a charging inhibited state, in which charging the battery is inhibited, and to perform charging the battery in a case where both of the two protection devices are in a charging permitted state, in which charging the battery is permitted;
   a control device configured to, when the battery is connected to the connecting portion, bring the two protection devices into the charging permitted state to thereby permit charging the battery by the charging device; and
   a voltage detection device configured to detect a voltage value of a charging path from the charging device to the connecting portion,
   wherein a first protection device, which is one of the two protection devices, is configured such that its power consumption in the charging inhibited state is lower than its power consumption in the charging permitted state,
   a second protection device, which is the other of the two protection devices, is configured such that its power consumption in the charging permitted state is lower than its power consumption in the charging inhibited state, and
   the control device is configured to respectively set, when the battery is not connected to the connecting portion, the first protection device to the charging inhibited state and the second protection device to the charging permitted state, and thereafter switch, when the voltage value of the charging path detected by the voltage detection device is equal to or greater than a predetermined specified voltage value, the second protection device to the charging inhibited state.

2. The charger according to claim 1, further comprising:
   a display unit configured to display a state of the charger,
   wherein the control device is configured to display, in a case where the control device switches the second protection device to the charging inhibited state when the battery is not connected to the connecting portion, an abnormality on the display unit when the battery is thereafter connected to the connecting portion.

3. The charger according to claim 1, further comprising:
   a current detection device configured to detect a current value flowing through the charging path,
   wherein the control device is configured to respectively set, when the battery is connected to the connecting portion and charging of the battery by the charging device has been completed, the first protection device to the charging inhibited state and the second protection device to the charging permitted state, and thereafter switch, when the current value detected by the current detection device exceeds a predetermined specified current value, the second protection device to the charging inhibited state.

4. The charger according to claim 1, wherein
   each of the two protection devices includes a photo coupler configured to be brought into a conductive state by a light entering from a light emitting device into a light receiving device,
   the first protection device is configured such that the light emitting device of the photo coupler emits a light when the first protection device is in the charging permitted state, and
   the second protection device is configured such that the light emitting device of the photo coupler emits a light when the second protection device is in the charging inhibited state.

5. The charger according to claim 1, wherein
   the two protection devices include two switches provided in series in the charging path and configured to open and close the charging path, one switch of the two switches corresponding to the first protection device and the other switch of the two switches corresponding to the second protection device,
   the one switch includes a normally open switch configured to be brought into a closed state by electric conduction, and
   the other switch includes a normally closed switch configured to be brought into an open state by electric conduction.

* * * * *